United States Patent [19]

Yui et al.

[11] Patent Number: 5,501,726
[45] Date of Patent: Mar. 26, 1996

[54] INK FOR THERMAL INK JET RECORDING AND THERMAL INK JET RECORDING METHOD USING THE SAME

[75] Inventors: Toshitake Yui; Yoshiro Yamashita; Eisuke Hiraoka; Yasuharu Endo; Ken Hashimoto, all of Minami-ashigara, Japan

[73] Assignee: Fuji Xerox Co., Ltd., Tokyo, Japan

[21] Appl. No.: 391,182

[22] Filed: Feb. 21, 1995

[30] Foreign Application Priority Data

Feb. 25, 1994 [JP] Japan .................. 6-051010

[51] Int. Cl.$^6$ ............................................. C09D 11/02
[52] U.S. Cl. ................. 106/20 R; 106/22 R; 106/20 D
[58] Field of Search ............................... 106/20 R:22 R, 106/20 D

[56] References Cited

U.S. PATENT DOCUMENTS

| | | | |
|---|---|---|---|
| 4,388,115 | 6/1983 | Sugiyama et al. | 106/22 F |
| 4,446,470 | 5/1984 | Sugiyama et al. | 106/22 K |
| 4,923,515 | 5/1990 | Koike et al. | 106/20 D |
| 4,986,850 | 1/1991 | Iwata et al. | 106/20 D |
| 5,100,469 | 3/1992 | Pontes et al. | 106/20 R |
| 5,395,434 | 3/1995 | Tochihara et al. | 106/22 R |

FOREIGN PATENT DOCUMENTS

| | | |
|---|---|---|
| 60-34992 | 8/1985 | Japan. |
| 61-55546 | 11/1986 | Japan. |
| 62-11781 | 1/1987 | Japan. |
| 62-13388 | 3/1987 | Japan. |
| 1-263169 | 10/1989 | Japan. |

*Primary Examiner*—Helene Klemanski
*Attorney, Agent, or Firm*—Oliff & Berridge

[57] ABSTRACT

An ink for thermal ink jet recording comprising water, a coloring material, (a) 2,2'-thiodiethanol, and (b) $C_nH_{2n+1}O(CH_2CH_2O)_mH$, wherein n represents an integer of 3 to 6 and m represents an integer of 1 to 3; and the content of the component (a) is 3 to 20% by weight based on the ink and the content of the component (b) is from 1 to 20% by weight based on the ink.

11 Claims, No Drawings

INK FOR THERMAL INK JET RECORDING AND THERMAL INK JET RECORDING METHOD USING THE SAME

FIELD OF THE INVENTION

The present invention relates to an ink for thermal ink jet recording and a thermal ink jet recording method for recording on a recorded material by a thermal ink jet recording apparatus.

BACKGROUND OF THE INVENTION

In the principle of an ink jet recording system, a liquid or a molten solid ink is jetted from nozzles, slits, porous films, etc., to perform recording on papers, cloths, films, etc. As a system of jetting an ink, there are proposed various kinds of systems such as a so-called charge control system of jetting an ink by utilizing an electrostatic attraction force, a so-called drop-on-demand system (pressure pulse system) of jetting an ink by utilizing a vibration pressure of a piezo element, a so-called thermal ink jet system of jetting an ink by utilizing a pressure generated by forming and growing bubbles by applying a heat at a high temperature etc., and by these systems, very high precise images can be obtained.

As an ink being used for such an ink jet recording system, solutions or dispersions formed by dissolving or dispersing various water-soluble dyes or pigments in a liquid medium composed of water or a water-soluble organic solvent are known and used.

For the inks described above, various improvements have been investigated.

In regard to the ink being used for an ink jet printer, following 6 points;

(1) the ink has a good quick drying property on a paper,
(2) the ink gives uniform images having a high resolving power and a high density on a paper without causing blotting and fog,
(3) the ink does not cause clogging of the tips of nozzles by drying and always shows a good jetting stability,
(4) in a thermal ink jet system, the ink does not cause scorching on a heater or the ink does not cause a so-called heater trouble in which a material always in contact with the ink is eroded with the ink and finally a working electrode which is a part of the heater is short-circuited to make the heater unworkable,
(5) the ink has a good long storage stability, and
(6) even when continuous printing is carried out, the ink does not cause an image disturbance and an image defect, are investigated and for meeting these requirements, many attempts have been proposed.

Improvements of the quick drying property of the ink on papers are disclosed in JP-B-60-34992 (the term "JP-B" as used herein means an "examined published Japanese patent application"), JP-A-62-11781 (the term "JP-A" as used herein means an "unexamined published Japanese patent application"), and JP-B-62-13388 and they propose that the permeability of the ink into papers is improved by the addition of surface active agents or polyhydric alcohol derivatives.

However, in the improvements described in the foregoing patent publications, the drying property of images is improved by greatly improving the permeability of the ink into plain papers but at the same time there is a problem that the occurrence of an image blotting is increased. Also, when such an improvement is applied to a thermal ink jet system, there is a problem that scorching occurs on the heater.

On the other hand, with regard to the improvement of the quality of prints, the use of 2,2'-thiodiethanol has been variously proposed. For example, in JP-B-61-55546, it is disclosed to combine a specific dye and a solvent containing 2,2'-thiodiethanol. Also, in JP-A-1-263169, it is disclosed to combine Direct Black 168 and a specific solvent containing 2,2'-thiodiethanol.

However, when 2,2'-thiodiethanol is used, in particular, at continuous printing at a high-frequency, there are faults that images are disturbed and image defects are liable to occur, and also when 2,2'-thiodiethanol is used for a thermal ink jet system, there is a fault that a heater trouble is liable to occur.

As described above, conventionally used thermal ink jet recording inks do not satisfy all the required factors and hence the development of inks suitable for a thermal ink jet recording system has been demanded.

SUMMARY OF THE INVENTION

The present invention has been made under the present circumstances as described above.

An object of the present invention is to provide a thermal ink jet recording method which does not cause clogging of the tips of nozzles by drying of an ink, does not cause scorching on a heater, does not cause a heater trouble, and does not cause ink leakage from the head.

Another object of the present invention is to provide a thermal ink jet recording method showing a good quick drying property of an ink on a plain paper and capable of obtaining uniform images having no blotting in the case of forming the images by a thermal ink jet recording system and also capable of obtaining images forming an image disturbance and an image defect even in the case of continuous printing, in particular, in the case of continuous printing at a high-frequency.

As the result of various investigations, the inventors have discovered that the above objects can be attained by using an ink for use in a thermal ink jet system comprising water, a coloring material, (a) 2,2'-thiodiethanol, and (b) $C_nH_{2n+1}O(CH_2CH_2O)_mH$ (wherein n is an integer of from 3 to 6, m is an integer of from 1 to 3) as the indispensable components, wherein the content of component (a) is from 3 to 20% by weight and the content of component (b) is from 1 to 20% by weight both based on the ink, and have accomplished the present invention based on the discovery.

That is, the present invention is a thermal ink jet recording method of carrying out recording by acting a heat energy to an ink to heat the ink drops and jetting the ink drops onto a recorded material, which comprises using the ink described above.

DETAILED DESCRIPTION OF THE INVENTION

The present invention is described in detail.

First, the ink being used in the present invention is explained. The ink contains water, a coloring material, the foregoing component (a), and the foregoing component (b) as the indispensable components together with optional components such as a surface active agent, a pH controlling agent, etc.

The content of 2,2'-thiodiethanol which is the foregoing component (a) is required to be from 3 to 20% by weight, and is preferably in the range of from 4 to 18% by weight. If the content of the component (a) is less than 3% by weight, clogging at the tips of nozzles occur and blotting is liable to occur on the paper, while the content of the component (a) is larger than 20% by weight, in particular, in the case of printing at a high speed, the disturbance and the defect of images caused by the disturbance of jetting are undesirably liable to occur.

The component (b) is shown by the following formula;

$$C_nH_{2n+1}O(CH_2CH_2O)_mH$$

wherein n is required to be in the range of an integer of from 3 to 6. If n is less than 3, the effect of permeation of the ink into a plain paper is not sufficiently obtained and if n is over 6, the compatibility with water becomes insufficient. Also, m is required to be in the range of from 1 to 3. If the value of m is over 3, the compatibility with water is too good to give the sufficient effect of the permeation into a paper.

Examples of the component (b) include $C_3H_7O(CH_2CH_2O)_2H$, $C_4H_9O(CH_2CH_2O)_3H$, and $C_6H_{13}O(CH_2CH_2O)_2H$.

The compounds shown by the above formula may be used singly or as a mixture of two or more kinds thereof as the ink component. The content of the compound in the ink is required to be from 1 to 20% by weight for accelerating the permeation of the ink into papers, is particularly preferably from 3 to 10% by weight. If the content is less than 1% by weight, the effect thereof is not sufficiently obtained, while if the content is over 20% by weight, the lines or images formed are liable to become excessively thick and further the jetting stability is reduced and thus the image defect is liable to form.

The ink being used in the present invention can contain, if necessary, known various moisture-retaining agents. As such a moisture-retaining agent, polyhydric alcohols such as ethylene glycol, diethylene glycol, propylene glycol, polyethylene glycol, triethylene glycol, hexylene glycol, glycerin, 1,2,6-hexanetriol, 1,5-pentanediol, etc.; basic solvents such as pyrrolidone, N-methyl- 2-pyrrolidone, cyclohexylpyrrolidone, triethanolamine, etc.; and alcohols such as ethanol, isopropyl alcohol, butyl alcohol, benzyl alcohol, etc., can be used. Of these compounds, ethylene glycol, diethylene glycol, and glycerin are particularly preferred and they can be used as a mixture thereof.

In the present invention, as the foregoing coloring materials, oil-soluble dyes containing various dyes, pigments, colored polymers, waxes, etc., can be used but the use of water-soluble dyes, particularly, acidic dyes and direct dyes are preferred.

Examples of the acidic dyes and direct dyes include, there are Basacid Black X34 Liquid (trade name, made by BASF A.G.), Special Black SP Liquid and Special Black HF (trade names, made by Bayer A.G.), C.I. Direct Black-4, -9, -11, -17, -19, -22, -32, -80, -151, -154, -168, -171, and -194; C.I. Direct Blue-1, -2, -6, -8, -22, -34, -70, -71, -76, -78, -86, -142, -199, -200, -201, -202, -203, -207, -218, -236, and -287; C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, and -189; C.I. Direct Yellow-1, -2, -4, -8, -11, -12, -26, -27, -28, -33, -34, -41, -44, -48, -86, -87, -88, -135, -142, and -144; C.I. Food Black-1 and -2; C.I. Acid Black-1, -2, -7, -16, -24, -26, -28, -31, -48, -52, -63, -107, -112, -118, -119, -121, -172, -194 and -208; C.I. Acid Blue-1, -7, -9, -15, -22, -23, -27, -29, -40, -43, -55, -59, -62, -78, -80, -81, -90, -102, -104, -111, -185, and -254; C.I. Acid Red-1, -4, -8, -13, -14, -15, -18, -21, -26, -35, -37, -249, and -257; C.I. Acid Yellow-1, -3, -4, -7, -11, -12, -13, -14, -19, -23, -25, -34, -38, -41, -42, -44, -53, -55, -61, -71, -76, and -79, etc.

These dyes can be used singly or as a mixture thereof and in addition to the four primary colors of cyan, magenta, yellow, and black, they may be toned into custom colors such as red, blue, green, etc.

The content of the dye(s) is in the range of from 0.3 to 10% by weight, and preferably from 1 to 8% by weight to the total amount of the ink.

Also, the ink of the present invention may contain so-called surface active agents, dispersing agents, inclusive compounds, etc., for further stabilizing the dissolved or dispersed state of the coloring material.

As the surface active compound, nonionic surface active agents, anionic surface active agents, cationic surface active agents, or amphoteric surface active agents may be used.

Examples of the nonionic surface active agent include polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, a polyoxyethylene/polyoxypropylene block copolymer, polyoxyethylene sorbitan fatty acid ester, and fatty acid alkylolamide. Examples of the anionic surface active agent, include an alkylbenzenesulfonate, an alkylphenylsulfonate, an alkylnaphthalenesulfonate, a formarine condensation product of an alkylnaphthalenesulfonate, a high fatty acid salt, a sulfuric acid ester salt of a higher fatty acid ester, a sulfonate of a higher fatty acid ester, a sulfuric acid salt of a higher alcohol ether, a sulfonate of a higher alcohol ether, an alkylcarboxylate of a higher alkyl sulfonamide, a sulfosuccinate, and an ester salt. Examples of cationic surface active agent, include a primary amine, a secondary amine, a tertiary amine, and a quaternary ammonium salt. Examples of the amphoteric surface active agent, there betaine, sulfobetaine, and sulfate betaine. Of these surface active agents, the anionic surface active agents are preferably used.

As other surface active agents, an acrylic acid/methacrylic acid/maleic acid copolymer, an acrylate/methacrylate/maleate series water-soluble polymer, polyethyleneimine, polyamines, polyvinylpyrrolidone, polyethylene glycol, cellulose derivatives, cyclodextrin, macrocyclic amines, crown ethers, urea, acetamide, etc., can be used.

The ink in this invention can further contain, if necessary, a pH controlling agent, an antifoggant, a viscosity controlling agent, an electric conductivity imparting agent, etc.

Then, a thermal ink jet recording method using the foregoing ink is explained. The thermal ink jet recording method is a recording method utilizing a film boiling phenomenon and a heater is equipped in the recording head. As the material for the recording head, silicon, polyimide, an epoxy resin, etc., is used and silicon is preferably used. Also, at printing, the heating temperature by the heater is at least 150° C. Furthermore, the frequency at driving is preferably from 2 KHz to 15 KHz, more preferably 5 KHz or more. In the present specification, high frequency driving corresponds to high speed printing. In the case of using a conventional ink for high speed printing, the ink oozes from a nozzle to stain the vicinity of the tip of the nozzle and to cause a printing defect. On the other hand, the foregoing trouble can be prevented.

Then, the present invention is further described in more detail by the following examples.

EXAMPLES 1 TO 9 AND COMPARATIVE EXAMPLES 1 to 5

Each components shown in Table 1 (Examples 1 to 9) and Table 2 (Comparative Examples 1 to 5) was used together with an ion-exchanged water as a balance in the total amount of 100% by weight and the mixture was sufficiently mixed to dissolve the components. After filtering the solution obtained with a filter of 0.2 μm under pressure, the solution was subjected to a degassing treatment by using a vacuum pump to provide each of inks. On each of the inks thus prepared, the following tests were applied and the results obtained are shown in Table 3 below.

(1) Ink Surface Tension:

The ink surface tension was measured using a Wilhelmy's tensiometer under the circumstances of 20° C. and 50% RH.

(2) Ink Viscosity:

The viscosity was measured at a shear rate of 1,400 s$^{-1}$ under the circumstances of 20° C. and 50% RH.

(3) Print Test (Image quality):

By using an ink jet printer (thermal ink jet system, 300 dpi) as a trial product, the print test of each ink was carried out using an FX-L paper (uncoated plain paper; trade name, made by Fuji Xerox Co., Ltd.). The evaluation was visually carried out by the following standards.

o: A Chinese character of 5 points is readable.

Δ: Chinese character of 8 points is readable.

×: A Chinese character of 10 points is unreadable.

Also, about fine scattering of the ink, the presence or absence of the generation thereof was determined around a solid image at which fine scattering is relatively liable to occur.

(4) Dry Time Test:

An FX-L paper (made by Fuji Xerox Co., Ltd.) as a plain paper and a coated paper for ink jet (made by Xerox Corporation) were used. A solid black image of 51 mm×10 mm was printed on the FX-L paper, the coated paper for ink jet was superposed on the printed FX-L paper and a pressure was applied thereto from above. In this case, the time until the ink on the printed FX-L paper was not transferred onto the side of the coated paper for ink jet was defined as the dry time and the dry time was evaluated by the following standards.

o: Shorter than 30 seconds.

Δ: From 30 seconds to 60 seconds.

×: Longer than 60 seconds.

(5) Image Defect Test:

A printing test was carried out in an atmosphere of 20° C. and 50% RH, the continuous run test of 300 prints at 3 kHz, 5 kHz, and 7 kHz, respectively was carried out, the presence of the occurrence of the heater trouble, blank area of images, bending of lines, and the distortion of images were observed to determine the presence or absence of the image defects. (In addition, in Table 3, × means that the defects were observed, Δ means that the detects were partially observed, and o means that the defects were not observed.).

At the same time, the dot diameters were measured and the occurrence of scorching on the head was evaluated by the following standards.

o: The change of the dot diameter was less than ±10%.

Δ: The change of the dot diameter was less than ±15%.

×: The change of the dot diameter was more than ±15%.

(6) Clogging Test:

After allowing to stand each ink for a prescribed time in an atmosphere of 10° C. and 15% RH and an atmosphere of 30° C. and 85% RH, the print test was carried out and the evaluation was carried out by the following standards.

o: Printable after allowing to stand for 300 seconds.

Δ: Printable after allowing to stand for 180 seconds.

×: Unprintable after allowing to stand for 180 seconds.

The results obtained are shown in Table 3 below.

TABLE 1

|  | Dye (wt. %) | 2,2'-thiodiethanol (wt. %) | $C_nH_{2n+1}O(CH_2CH_2O)_mH$ (wt. %) | Moisture Retaining Agent (wt. %) | Other Additive |
| --- | --- | --- | --- | --- | --- |
| Example 1 | C.I. Food Black #2 (3 wt. %) | 5 | $C_3H_7O(CH_2CH_2O)_2H$ (5) | — | — |
| Example 2 | C.I. Food Black #2 (3 wt. %) | 6 | $C_3H_7O(CH_2CH_2O)_2H$ (10) | Diethylene glycol (15) | — |
| Example 3 | C.I. Food Black #2 (3 wt. %) | 8 | $C_3H_7O(CH_2CH_2O)_3H$ (8) | Glycerin (10) | Isopropyl alcohol (3 wt. %) |
| Example 4 | C.I. Food Black #2 (3 wt. %) | 6 | $C_4H_9O(CH_2CH_2O)_3H$ (8) | Glycerin (5) | $C_{18}H_{35}O(CH_2CH_2O)_{15}H$ (0.1 wt. %) |
| Example 5 | C.I. Direct Black 168 (4 wt. %) | 7 | $C_4H_9O(CH_2CH_2O)_2H$ (4) | Ethylene glycol (10) | — |
| Example 6 | C.I. Direct Blue 199 (3 wt. %) | 6 | $C_3H_7O(CH_2CH_2O)_2H$ (10) | Diethylene glycol (5) | — |
| Example 7 | C.I. Acid Red 257 (2.5 wt. %) | 4 | $C_3H_7O(CH_2CH_2O)_2H$ (15) | Glycerin (5) | — |
| Example 8 | Basacid Black X34 Liquid (10 wt. %) | 3 | $C_3H_7O(CH_2CH_2O)_2H$ (5) | Glycerin (5) | — |
| Example 9 | Bayscript Black SP Liquid (10 wt. %) | 3 | $C_3H_7O(CH_2CH_2O)_2H$ (4) | Diethylene glycol (5) | — |

TABLE 2

|  | Dye (wt. %) | 2,2'-thiodiethanol (wt. %) | $C_nH_{2n+1}O(CH_2CH_2O)_mH$ (wt. %) | Moisture Retaining Agent (wt. %) | Other Additive |
| --- | --- | --- | --- | --- | --- |
| comparative Example 1 | C.I. Direct Black 168 (4 wt. %) | 10 | (0) | Diethylene glycol (5) | — |
| Comparative Example 2 | C.I. Direct Black 168 (2.5 wt. %) | 25 | $C_3H_7O(CH_2CH_2O)_2H$ (3) | — | — |
| Comparative Example 3 | C.I. Food Black #2 (3 wt. %) | 2 | $C_3H_7O(CH_2CH_2O)_2H$ (10) | Ethylene glycol (5) | — |
| Comparative Example 4 | C.I. Direct Blue 199 (2 wt. %) | 16 | $C_3H_7O(CH_2CH_2O)_4H$ (10) | Diethylene glycol (5) | — |
| Comparative Example 5 | C.I. Direct Black 154 (3 wt. %) | 5 | $C_4H_9O(CH_2CH_2O)_1H$ (10) | Glycerin (5) | — |

TABLE 3

|  | Ink surface tension (mN/m) | Ink viscosity (mPas) | Image quality | Dry time | Image Defect 3 kHz | Image Defect 5 kHz | Image Defect 7 kHz | Thermal ink jet system test Dot diameter change | Thermal ink jet system test Heater trouble | Clogging Test |
| --- | --- | --- | --- | --- | --- | --- | --- | --- | --- | --- |
| Example 1 | 40 | 1.7 | O | O | O | O | O | O | O | O |
| Example 2 | 36 | 2.3 | O | O | O | O | O | O | O | O |
| Example 3 | 37 | 2.8 | O | O | O | O | O | O | O | O |
| Example 4 | 37 | 2.1 | O | O | O | O | O | O | O | O |
| Example 5 | 41 | 2.2 | O | O | O | O | O | O | O | O |
| Example 6 | 35 | 2.1 | O | O | O | O | O | O | O | O |
| Example 7 | 33 | 2.8 | O | O | O | O | O | O | O | O |
| Example 8 | 41 | 1.7 | O | O | O | O | O | O | O | O |
| Example 9 | 41 | 1.5 | O | O | O | O | O | O | O | O |
| Comparative Example 1 | 60 | 1.5 | O | X | O | Δ | X | O | X | O |
| Comparative Example 2 | 44 | 2.9 | Δ | X | O | X | X | O | X | O |
| Comparative Example 3 | 34 | 1.9 | X | O | O | O | Δ | X | O | X |
| Comparative Example 4 | 39 | 3.1 | O | X | O | O | O | O | O | O |
| Comparative Example 5 | 31 | 2.1 | O | O | X | X | X | X | O | O |

Since the thermal ink jet recording method of the present invention uses the ink composed of the components described above, scorching onto the heater does not occur and a heat trouble does not occur. Also, clogging of nozzle tips by drying of the ink does not cause and link leakage from the heads of the nozzles does not occur. Furthermore, according to the thermal ink jet recording method of the present invention, the drying property of the ink is good even on a plain paper and uniform images having no ink leakage can be obtained and at continuous printing, in particular, at continuous printing by a high frequency, images having neither image turbidity and nor image defect can be formed.

While the invention has been described in detail and with reference to specific embodiment thereof, it will be apparent to one skilled in the art that various changes and modifications can be made therein without departing from the spirit and scope thereof.

What is claimed is:

1. An ink for thermal ink jet recording comprising water, a coloring material, (a) 2,2'-thiodiethanol, and (b) $C_nH_{2n+1}O(CH_2CH_2O)_mH$, wherein n represents an integer of 3 to 6 and m represents an integer of 1 to 3; and the content of the component (a) is 3 to 20% by weight based on said ink and the content of the component (b) is from 1 to 20% by weight based on said ink.

2. The ink as claimed in claim 1, wherein said coloring material is at least one selected from the group consisting of direct dyes and acidic dyes.

3. A thermal ink jet recording method comprising applying a heat energy to an ink and carrying out recording by jetting said ink to a recorded material, wherein said ink comprises water, a coloring material, (a) 2,2'-thiodiethanol, and (b) $C_nH_{2n+1}O(CH_2CH_2O)_mH$; wherein n represents an integer of 3 to 6 and m represents an integer of 1 to 3; and the content of the component (a) is 3 to 20% by weight based on said ink and the content of the component (b) is from 1 to 20% by weight based on said ink.

4. The thermal ink jet recording method as claimed in claim 3, wherein a high frequency printing is conducted by applying a pulse for heating of a frequency of 5 KHz or more to said ink.

5. The thermal ink jet recording method as claimed in claim 3, wherein said coloring material is at least one selected from the group consisting of direct dyes and acidic dyes.

6. The ink as claimed in claim 1, wherein the content of the component (a) is 4 to 18% by weight.

7. The ink as claimed in claim 1, wherein the content of the component (b) is from 3 to 10% by weight.

8. The thermal ink jet recording method as claimed in claim 3, wherein the content of the component (a) is 4 to 18% by weight.

9. The thermal ink jet recording method as claimed in claim 3, wherein the content of the component (b) is from 3 to 10% by weight.

10. The thermal ink jet recording method as claimed in claim 3, wherein a high frequency printing is conducted by applying a pulse for heating at a frequency of 2 KHz to 15 KHz to said ink.

11. The thermal ink jet recording method as claimed in claim 3, comprising jetting said ink by utilizing pressure generated by forming bubbles by the application of heat.

* * * * *